(12) United States Patent
Imai

(10) Patent No.: US 10,915,281 B2
(45) Date of Patent: Feb. 9, 2021

(54) PRINTING APPARATUS HAVING CHANGEABLE PRINT SETTINGS, CONTROL METHOD, AND STORAGE MEDIUM

(71) Applicant: CANON KABUSHIKI KAISHA, Tokyo (JP)

(72) Inventor: Yasuhiro Imai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/655,296

(22) Filed: Oct. 17, 2019

(65) Prior Publication Data
US 2020/0142654 A1     May 7, 2020

(30) Foreign Application Priority Data

Nov. 5, 2018 (JP) ................................ 2018-207878

(51) Int. Cl.
G06F 3/12 (2006.01)
(52) U.S. Cl.
CPC .......... *G06F 3/1259* (2013.01); *G06F 3/1241* (2013.01); *G06F 3/1253* (2013.01)
(58) Field of Classification Search
None
See application file for complete search history.

(56) References Cited

U.S. PATENT DOCUMENTS

| | | | | |
|---|---|---|---|---|
| 2006/0087680 A1* | 4/2006 | Maeda | ................. | G06F 3/1227 358/1.15 |
| 2009/0251725 A1* | 10/2009 | Kuwahara | ............. | G06F 3/1204 358/1.15 |
| 2011/0235114 A1* | 9/2011 | Saitoh | ................ | H04N 1/00233 358/1.15 |
| 2011/0310409 A1* | 12/2011 | Yukumoto | ......... | H04N 1/00416 358/1.9 |
| 2016/0266849 A1* | 9/2016 | Honda | ................... | G06F 3/1224 |
| 2019/0114125 A1* | 4/2019 | Imai | ...................... | G06F 3/1257 |

FOREIGN PATENT DOCUMENTS

JP     2015-060272 A     3/2015

OTHER PUBLICATIONS

English Translation of Kana, JP 2015-060272 (Year: 2015).*

* cited by examiner

*Primary Examiner* — Mohammad H Ghayour
*Assistant Examiner* — Pawan Dhingra
(74) *Attorney, Agent, or Firm* — Venable LLP

(57) ABSTRACT

A printing apparatus acquires change history information indicating a print setting value of a print setting item has been changed in accordance with received change instructions, with the print setting item being a print setting item that has not been able to be set for the print job selected from a list by an external device having transmitted the print job to the printing apparatus, and displays recommended settings that are print settings determined based on the acquired change history information about the selected print job. A print setting value of a print setting item of a print job selected from the list is changed based on a selection of the displayed recommended settings, and the selected print job is executed by using print setting values including the print setting value that has been changed in accordance with the received change instruction.

6 Claims, 10 Drawing Sheets

PRINTING APPARATUS HAVING CHANGEABLE PRINT SETTINGS, CONTROL METHOD, AND STORAGE MEDIUM

BACKGROUND OF THE INVENTION

Field of the Invention

The present disclosure relates to a printing apparatus, a control method, and a storage medium to perform printing processing based on a print job that has been input from an information processing device, a control method, and a storage medium.

Description of the Related Art

Conventionally, there has been known an image forming apparatus provided with a function referred to as "hold printing" in order to ensure security. In the hold printing function, when a print job is input from an application program installed in an information processing device such as a PC (personal computer) and a mobile terminal, the print job is temporarily stored on, for example, a hard disk of the image forming apparatus, instead of being immediately printed and output. When a user operates and thereby logs in the image forming apparatus, the image forming apparatus displays a list of print jobs corresponding to the user on a display screen and the like. Subsequently, when the user selects one or more print jobs from the list, the image forming apparatus performs printing processing using the selected print job.

In the hold printing function, in order to correct a print setting error, it is possible to change the print setting by using an operation device of the image forming apparatus when a print job is selected from the list.

In recent years, the use of a mobile terminal and the like has increased, and accordingly, the input of print jobs to the image processing apparatus through various application programs of the mobile terminal and the like has increased. However, in the application programs of the mobile terminal and the like, not all of the setting items that are available in the image forming apparatus can be set for jobs that are input to the image forming apparatus. That is, non-settable items exist in the application program. In the image forming apparatus, these non-settable items are set to predetermined values. Hence, if a user attempts to obtain a desired print appearance by arbitrarily setting the values of these non-settable items, it is necessary to use the hold printing function and perform a setting change operation for the non-settable items in the application program when executing a print job in the image forming apparatus. For this reason, in the conventional image processing devices, changing the print setting is further needed in some cases even though the print setting has been performed by the application program, thereby causing the operation burden for the user to be heavy.

In contrast, for example, Japanese Unexamined Patent Application No. 2015-60272 discloses a technique in which the histories of the print settings used in the past are stored in association with the type of print application programs, terminal information, and user information, and if it is determined that a print error has occurred in the user's print setting, the user is recommended to change the print setting to the print setting stored as the history.

In Japanese Unexamined Patent Application, First Publication No. 2015-60272, each print setting stored in the history is considered to include all print items, and accordingly, all print items are simultaneously updated if the recommended print setting is adopted.

Accordingly, if the technique disclosed in Japanese Unexamined Patent Application No. 2015-60272 is applied to the printing processing based on the print job that has been input to the image forming apparatus from the mobile terminal and the like, all of the print setting items set by an application program of the mobile terminal and the like (in other words, the print setting items included in the print job) are updated to recommended setting values upon a change of the print setting in accordance with the recommended setting described above. Specifically, if there is an attempt to use the recommended function of the print setting in the image forming apparatus, the print setting function of the application program cannot be used.

SUMMARY OF THE INVENTION

The present invention provides a printing apparatus comprising: an operation device; a memory storing instructions; and a processor which is capable of executing the instructions causing the printing apparatus to: receive a print job from an external device; store the received print job; receive a change instruction for a print setting for the stored print job from a user by the operation device; execute the stored print job by using the print setting that has been changed in accordance with the received change instruction; manage change history information indicating a content of the change of the print setting; and present a recommended setting that is a print setting determined based on the managed change history information by the operation device upon receipt of the change instruction for the print setting for the stored print job from the user by the operation device.

Further features of the present invention will become apparent from the following description of experimental entities (with reference to the attached drawings).

DESCRIPTION OF THE EMBODIMENTS

Hereinafter, the best mode for carrying out the present invention will be described with reference to the drawings.

Embodiment 1

Figure 1:
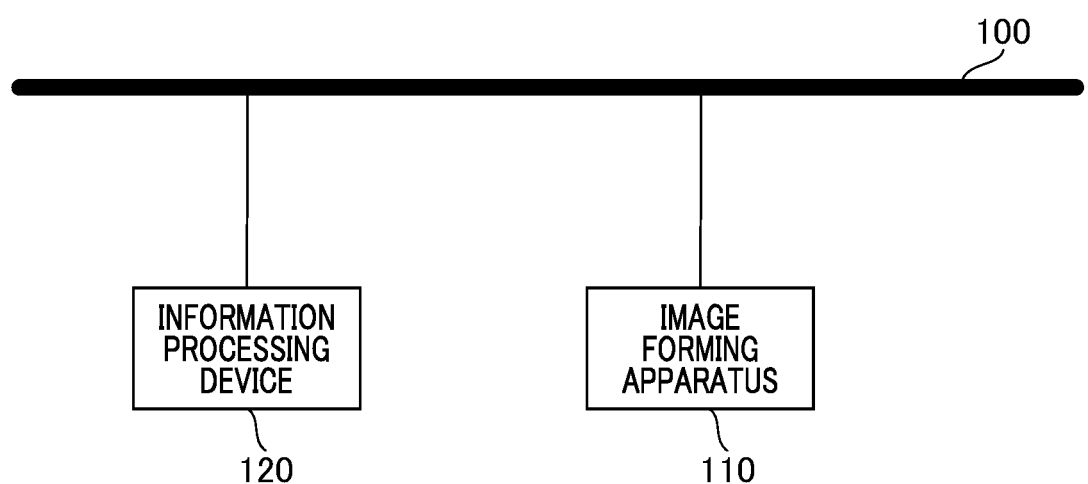
FIG. 1 is a conceptual diagram illustrating an example of a network configuration according to each embodiment of the present invention.

FIG. 1 illustrates an example of a network configuration for realizing the print setting method according to the present embodiment.

job was input, the storage location of the input print job data, the print job name, the print settings, the print protocol, and the user agent.

The combination of the printing protocol and the user agent is used as information for selecting a job input means that has input a print job to the image forming apparatus 110. The print protocol differs depending on the type of the print application program used in the information processing device 120. Additionally, the user agent is information about an operating system (OS) installed in the information processing device 120. Accordingly, it is possible to specify what print application program on what OS has input the print job by the combination of the print protocol and the user agent. In the present embodiment, the print application program thus specified is referred to as a "job input means".

TABLE A

| DATE AND TIME | IP ADDRESS | STORAGE LOCATION | PRINT JOB NAME | PRINT SETTING | PRINT PROTOCOL | USER AGENT |
|---|---|---|---|---|---|---|
| 2016 Apr. 10 10:34:45 | 192.168.2.11 | /data/0015/xxx | AAA.txt | 1-SIDED, 1 IN 1, MONOCHROME | IPP | Android |
| 2016 Apr. 20 13:50:22 | 192.168.2.11 | /data/0591/yyy | BBB.pdf | 2-SIDED, 2 IN 1 COLOR STAPLE: UPPER RIGHT, PUNCHING: YES | LPR | iOS |
| 2016 May 28 14:10:00 | 192.168.2.11 | /data/8125/zz | CCC.doc | 2-SIDED, 1 IN 1 COLOR | IPP | iOS |
| . . . | . . . | . . . | . . . | . . . | . . . | . . . |

In FIG. 1, an image forming apparatus 110 executes printing processing. An information processing device 120 is, for example, a PC or a mobile terminal. The image forming apparatus 110 and the information processing device 120 are connected to the Internet 100. The information processing device 120 inputs a print job to the image forming apparatus 110 by using a print application program on the information processing device 120.

The image forming apparatus 110 receives a print job from the information processing device 120 via the Internet 100 and manages print data and bibliographic information stored in the print job.

The image forming apparatus 110 performs authentication processing in accordance with the operation of the user and allows the authenticated user to log in. Further, the image forming apparatus 110 selects print jobs that can be printed by the logged-in user based on the above bibliographic information and displays the selected print jobs as a list on the display screen of the operation device. Subsequently, when the user selects a desired print job from the display list and performs a printing instruction operation, the image forming apparatus 110 performs printing processing by using the print data.

Table A shows an example of the bibliographic information, which is information stored in the print job.

Table A is a bibliographic information table for one user. Although one or a plurality of print jobs are input to the image forming apparatus 110 from a plurality of users, the bibliographic information table is made for each user and stored.

In the example of Table A, the bibliographic information includes the date and time when the print job was input, the IP address of the image forming apparatus to which the print In the present embodiment, the information processing device 120 inputs a print job to the image forming apparatus 110, and the image forming apparatus 110 manages the print job. However, the management of the print job may be performed by an apparatus other than the image forming apparatus 110, for example, an information processing device 120 or a storage server (not illustrated) connected to the image forming apparatus 110 via the Internet 100. If the storage server manages a print job, the print job is input from the information processing device 120 to the storage server and is held by the storage server. Subsequently, when the user logs in the image forming apparatus 110, the image forming apparatus 110 transmits a print job acquisition request to the storage server and acquires a print job from the storage server.

[Hardware Configuration of the Image Forming Apparatus]

Figure 2:
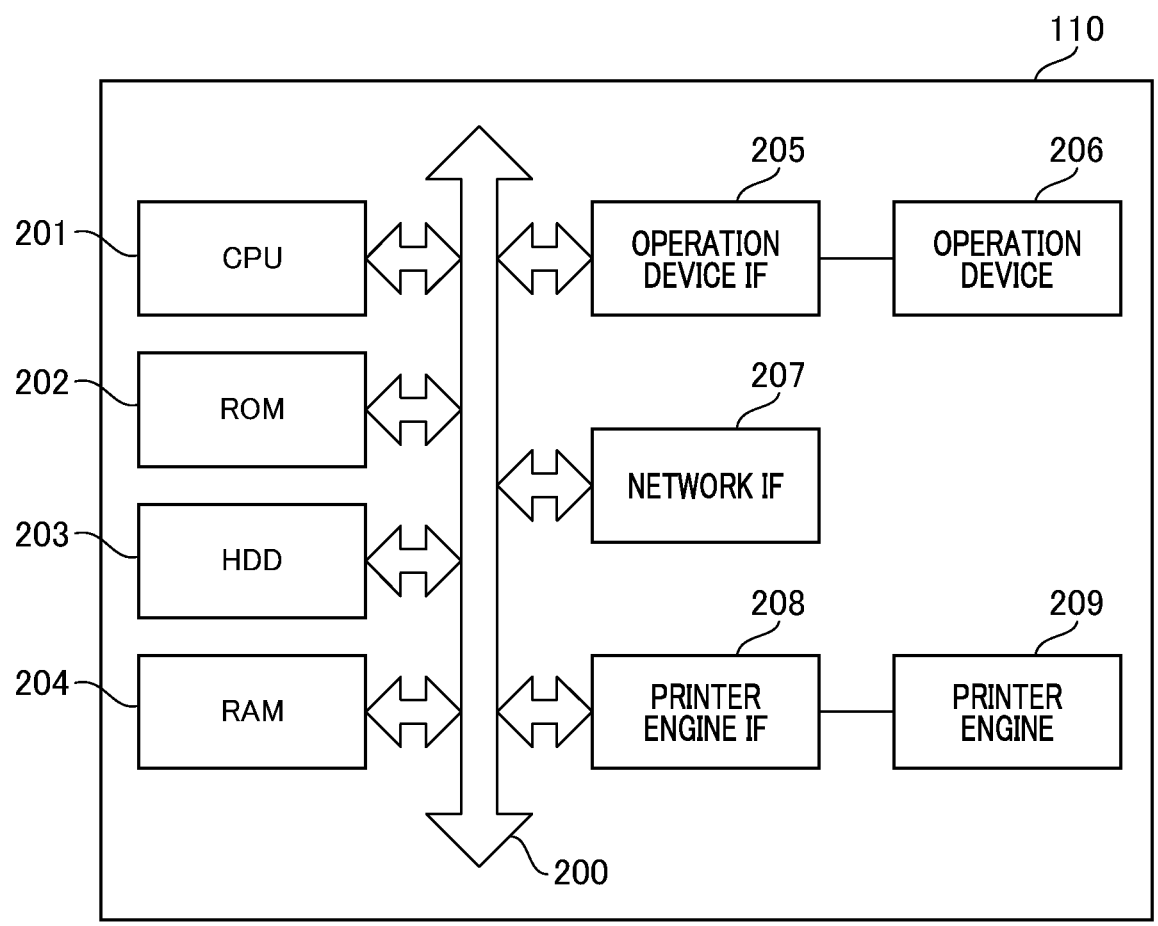
FIG. 2 is a block diagram illustrating an example of a hardware configuration of an image forming apparatus according to each embodiment of the present invention.

FIG. 2 is a block diagram illustrating an example of a hardware configuration of the image forming apparatus 110. As shown in FIG. 2, except for an operation device 206 and a printer engine 209, each component (each device) is connected to a system bus 200 of the hardware.

A CPU 201 executes programs stored in a ROM 202 and a RAM 204 to integrally control each device connected to the system bus 200.

An operating system (hereinafter, referred to as an "OS"), which is the control program of the CPU 201, and a program that performs various processing to be described below are respectively stored in the ROM 202 or a HDD 203. Additionally, the HDD 203 temporarily stores the bibliographic information and print job data (data to be printed), and stores a variety of data to be used for executing printing processing.

The RAM 204 functions as a main memory, a work area, and the like of the CPU 201.

The operation device 206 includes an input device such as a touch panel and a hardware key, and a display device such as an LCD. An operation device IF 205 controls input/output of the operation device 206.

A network IF 207 controls data communication with the information processing device 120 and the like via the Internet 100 and the like.

The printer engine 209 performs heat fixing processing based on the transferred image data on a sheet surface to form a permanent fixed image. A printer engine IF 208 outputs image data to the printer engine 209, and controls the printer engine 209 by using control signals.

[Software Configuration of the Image Forming Apparatus]

Figure 3:
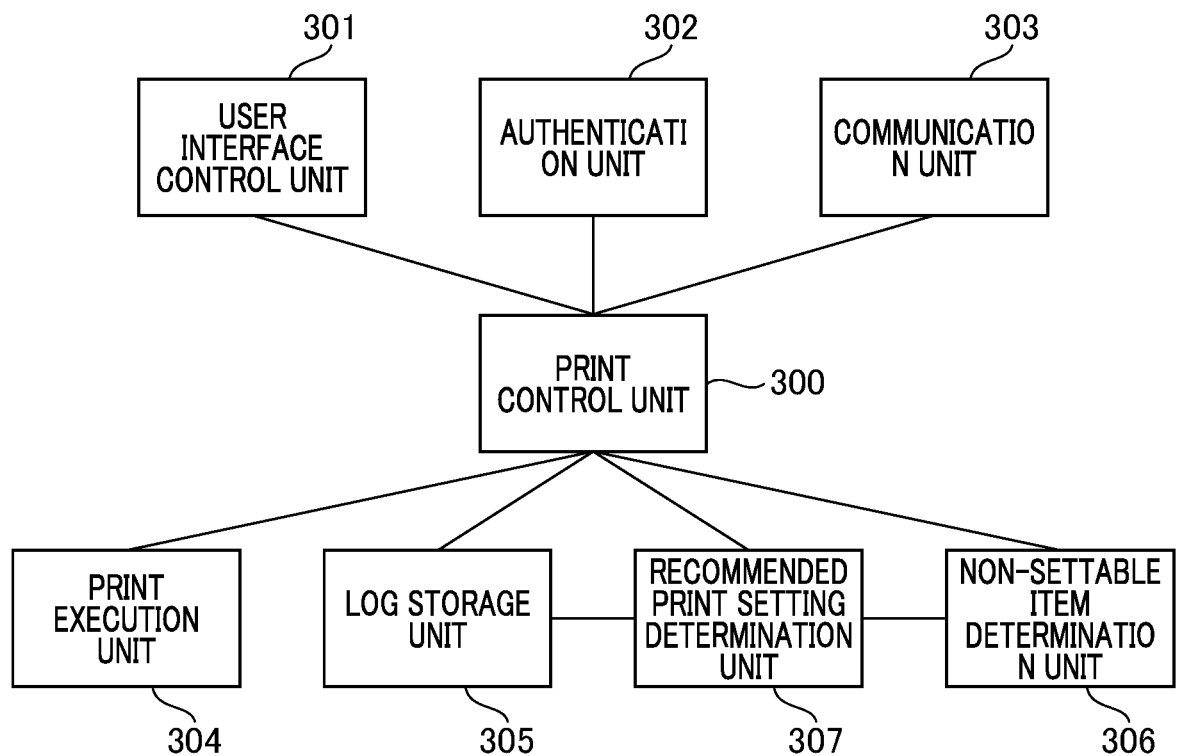
FIG. 3 is a block diagram illustrating an example of a software configuration of the image forming apparatus according to each embodiment of the present invention.

FIG. 3 illustrates an example of a software module configuration of the image forming apparatus 110 according to the present embodiment.

Each of the software modules shown in FIG. 3 is stored in the HDD 203, loaded into the RAM 204, and then executed by the CPU 201.

A user interface control unit 301 controls a user interface image displayed on the operation unit 206, and provides notifications about a variety of information input from the operation unit 206 to the related software modules.

An authentication unit 302 receives a login request notified from the user interface control unit 301, and then performs authentication processing based on the authentication information received from this user interface control unit 301.

A communication unit 303 controls the network IF 207 so as to communicate with the information processing device 120 and various servers connected via the network.

A print control unit 300 controls the entire printing processing during the hold printing and the normal printing by the image forming apparatus 110. During the hold printing and the like, the print control unit 300 also controls the user interface control unit 301 to display a user interface screen.

A print execution unit 304 controls the printer engine 209 to execute printing processing based on print settings and print job data included in the bibliographic information. Since the processing operation of the print execution unit 304 can be realized by a general method known by those skilled in the art, a description thereof will be omitted.

Here, it is assumed that the image forming apparatus 110 according to the present embodiment can set functions such as "N-in-one printing", "double-sided printing", "color mode", "staple", and "punching" as printing settings.

The "N-in-one printing" is a function for laying out and printing a plurality of pages of images generated by the print job data on a single page of paper, for example, images of 1 page, 2 pages, 4 pages, 6 pages, 8 pages, 9 pages, and 16 pages can be laid out on a single page of paper.

The "double-sided printing" is a function for specifying whether the printing processing is performed on only single side or both sides of the paper.

The "color mode" is a function for specifying whether an image is printed in monochrome or in color on paper in the image forming apparatus 110 that enables color printing.

The "staple" is a function for binding a plurality of output printing papers together with a metal needle or the like. In the image forming apparatus 110 according to the present embodiment, the binding position can be selected from among the upper left, the upper right, the lower right, or the lower left, in addition to whether the binding is to be performed or not.

The "punching" is a function for punching holes in the output print paper. In the present embodiment, it is possible to select whether or not punching holes is to be performed, in other words, it is possible to select "YES" or "NO".

Note that although various setting items can be provided in addition to the setting items described here, the description thereof will be omitted.

There is a case in which the setting items provided in the image forming apparatus 110 include "a non-settable item" that cannot be set by a print application program of the information processing device 120. The non-settable item is a setting item that is not included in the bibliographic information of the print job input from the information processing device 120 to the image forming apparatus 110. If the information processing device 120 is a mobile terminal, the non-settable item differs depending on, for example, a job input means (that is, the type of the application program specified by the combination of the OS installed in the mobile terminal and the print application program). If a non-settable item exists, the image forming apparatus 110 updates the bibliographic information so as to interpolate the non-settable item by a default value that has been set in advance and stored in the apparatus. Since the interpolation setting by this default value is generally used, the description thereof will be omitted in the present embodiment.

Upon execution of the printing processing by the print execution unit 304, a log storage unit 305 stores the print setting related to the printing processing as a print setting log. This print setting log is generated based on the bibliographic information and stored in the HDD 203 in association with the print protocol and the user agent. The print setting log stored in the HDD 203 is managed by the log storage unit 305.

Table B shows an example of a print setting logs. As shown in Table B, each print setting log is configured by the combination of "print protocol", "user agent", "setting items and setting values", "change presence/absence information", and "setting frequency".

The "change presence/absence information" is information indicating whether or not the setting has been changed, which is indicated by either "presence" or "absence". In this context, the "setting change" is information indicating whether or not the setting value has been changed from a value included in the bibliographic information when the information processing device 120 inputs a print job to the image forming apparatus 110. If the user changes the above non-settable item (that is, a setting item that cannot be set by the job input means) from the default value to another setting value in the image forming apparatus 110, "presence" is stored as "change presence/absence information".

"Setting frequency" indicates the number of times the printing processing is executed under the combination of "print protocol", "user agent", "setting items and setting values", and "change presence/absence information". If the printing processing performed by the combination is the first time, "1" is stored as the setting frequency. Thereafter, the value of "setting frequency" increases by "1" each time printing is performed with a similar combination.

TABLE B

| JOB INPUT MEANS | | SETTING | | CHANGE PRESENCE/ | |
|---|---|---|---|---|---|
| PRINT PROTOCOL | USER AGENT | SETTING ITEM | SETTING VALUE | ABSENCE INFORMATION | SETTING FREQUENCY |
| IPP | Android | N-IN-ONE PRINTING | 2in1 | PRESENCE | 10 |
| IPP | Android | PUNCHING | ON | PRESENCE | 9 |
| IPP | Android | COLOR MODE | AUTO | ABSENCE | 15 |
| IPP | Android | STAPLE | UPPER RIGHT | ABSENCE | 15 |
| LPR | iOS | N-IN-ONE PRINTING | 1in1 | ABSENCE | 15 |
| LPR | iOS | PUNCHING | ON | PRESENCE | 13 |
| ... | ... | ... | ... | ... | ... |

A non-settable item determination unit 306 determines a non-settable item corresponding to the bibliographic information based on the job input means corresponding to the notified bibliographic information (that is, an application program specified by the combination of the printing protocol and the user agent). In the present embodiment, for example, an item corresponding to the non-settable item is determined for each combination of the print protocol and the user agent and stored in the HDD 203.

A recommended print setting determination unit 307 determines the job input means corresponding to the notified bibliographic information and the corresponding non-settable item, and acquires the corresponding recommended print setting from the print setting log managed by the log storage unit 305 based on this determination result.

Table C shows an example of the non-settable items stored in the HDD 203. Specifically, Table C shows items that can be set by the application program (denoted by "√" in Table 4) and items that cannot be set by the application program, for each setting item and for each job input means (specifically, the type of application program specified by the combination of the print protocol and the user agent). Additionally, Table C shows the case where the printing protocol has two types, IPP and LPR, and the user agent is iOS (registered trade mark), Mac OS (registered trade mark), and Android (registered trade mark). For example, if the printing protocol is IPP and the user agent uses iOS, the paper size and N-in-one printing are not-settable items, and the other items are settable items.

First, the communication unit 303 receives a print job from the information processing device 120 (S401). The received print job is transmitted to the print control unit 300.

The print control unit 300 receives this print job and then determines whether or not the image forming apparatus 110 has been set to perform "storage of print job" (S402). The "storage settings for print job" is set for each image forming apparatus, and is stored in the HDD 203, the RAM 204, and the like.

If the "storage of print job" has not been set, the print control unit 300 requests the print execution unit 304 to execute a print job (S407), whereby the printing processing is executed and the printing processing ends.

In contrast, if "storage settings for print job" has been set, the print control unit 300 analyzes the print job and determines whether or not the print job is a job to be stored (S403).

For example, if the information given to the print job, for example, a print job name, a print job user name, and identification information of the information processing device 120 input to the print job, matches a predetermined condition, it is determined that the print job is a job to be stored. Alternatively, if the information given to the print job does not match the predetermined condition, the job may be determined as a job to be stored.

If it is determined in step S403 that the job is not a job to be stored, the print control unit 300 requests the print execution unit 304 to execute the print job (S407). Conse-

TABLE C

| | | PRINT PROTOCOL | | | | | |
|---|---|---|---|---|---|---|---|
| | | IPP | | | LPR | | |
| | USER AGENT | iOS | MacOS | Android | iOS | MacOS | Android |
| SETTING ITEM | COPIES | √ | √ | √ | √ | √ | √ |
| | 2-SIDED PRINTING | √ | √ | √ | √ | √ | √ |
| | PAPER SIZE | | | √ | √ | √ | √ |
| | COLOR MODE | √ | √ | √ | √ | √ | √ |
| | N-IN-ONE PRINTING | | √ | | √ | √ | √ |
| | STAPLE | √ | √ | √ | √ | √ | √ |
| | PUNCHING | √ | √ | | | | |
| | ... | ... | ... | ... | ... | ... | ... |

[Flow of Print Job Storage Processing of Hold Printing]

Figure 4:
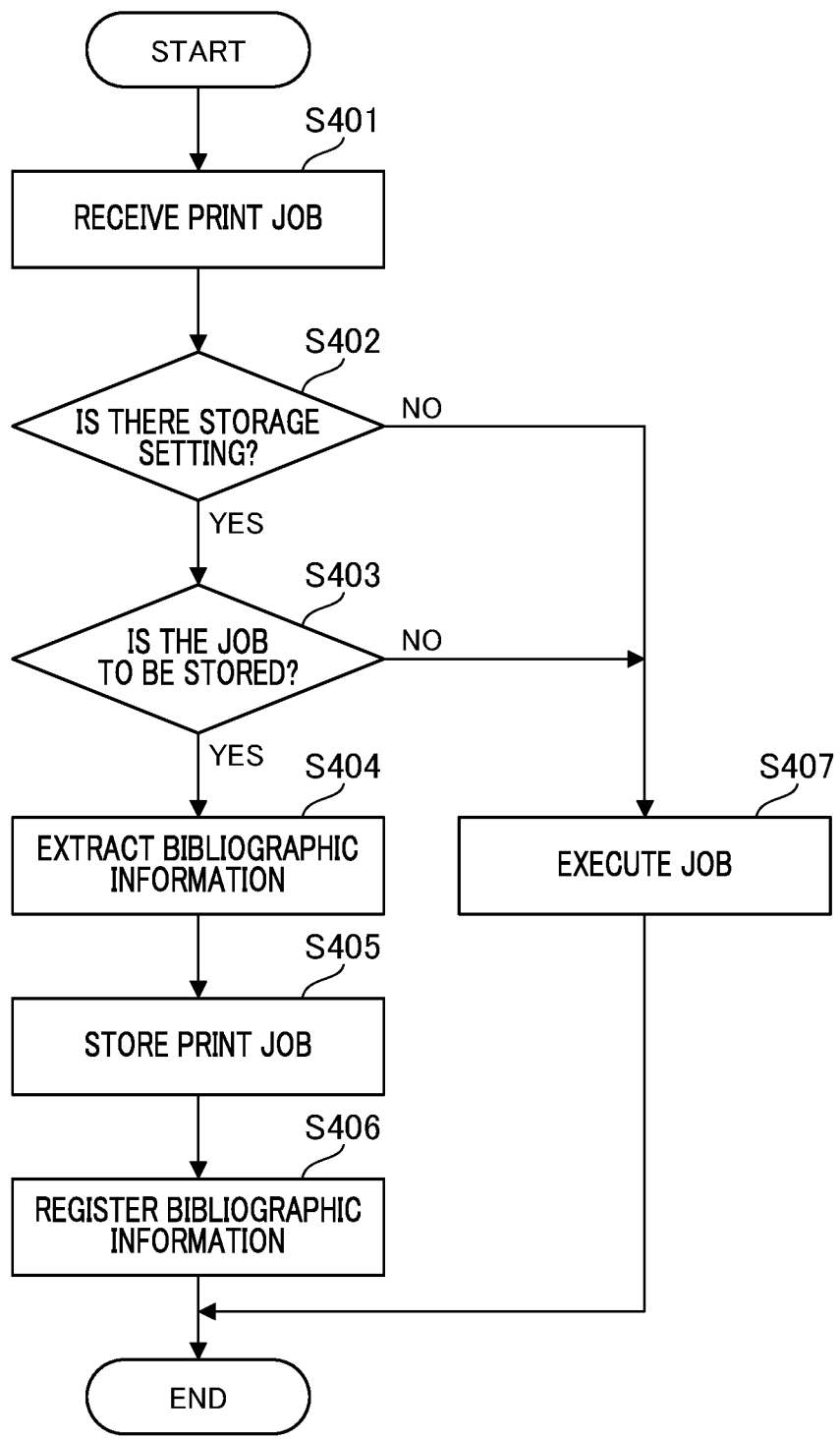
FIG. 4 is a flow chart illustrating print job storage processing of hold printing according to Embodiment 1 of the present invention.

FIG. 4 is a flowchart for explaining the print job storage processing executed by the CPU 201 of the image forming apparatus 110. This flowchart is executed by the software modules described in FIG. 3.

quently, the printing processing is executed and the print job storage processing of hold printing ends.

In contrast, if it is determined in step S403 that the job is a job to be stored, the print control unit 300 analyzes the print job and extracts bibliographic information from the print job (S404). Then, the print control unit 300 stores the print job in the HDD 203 (S405), and stores the extracted bibliographic information in the HDD 203 in association with the user (S406). As a result, the print job storage processing of hold printing ends.

[Flow of Print Execution Processing of Hold Printing]

Figure 5:
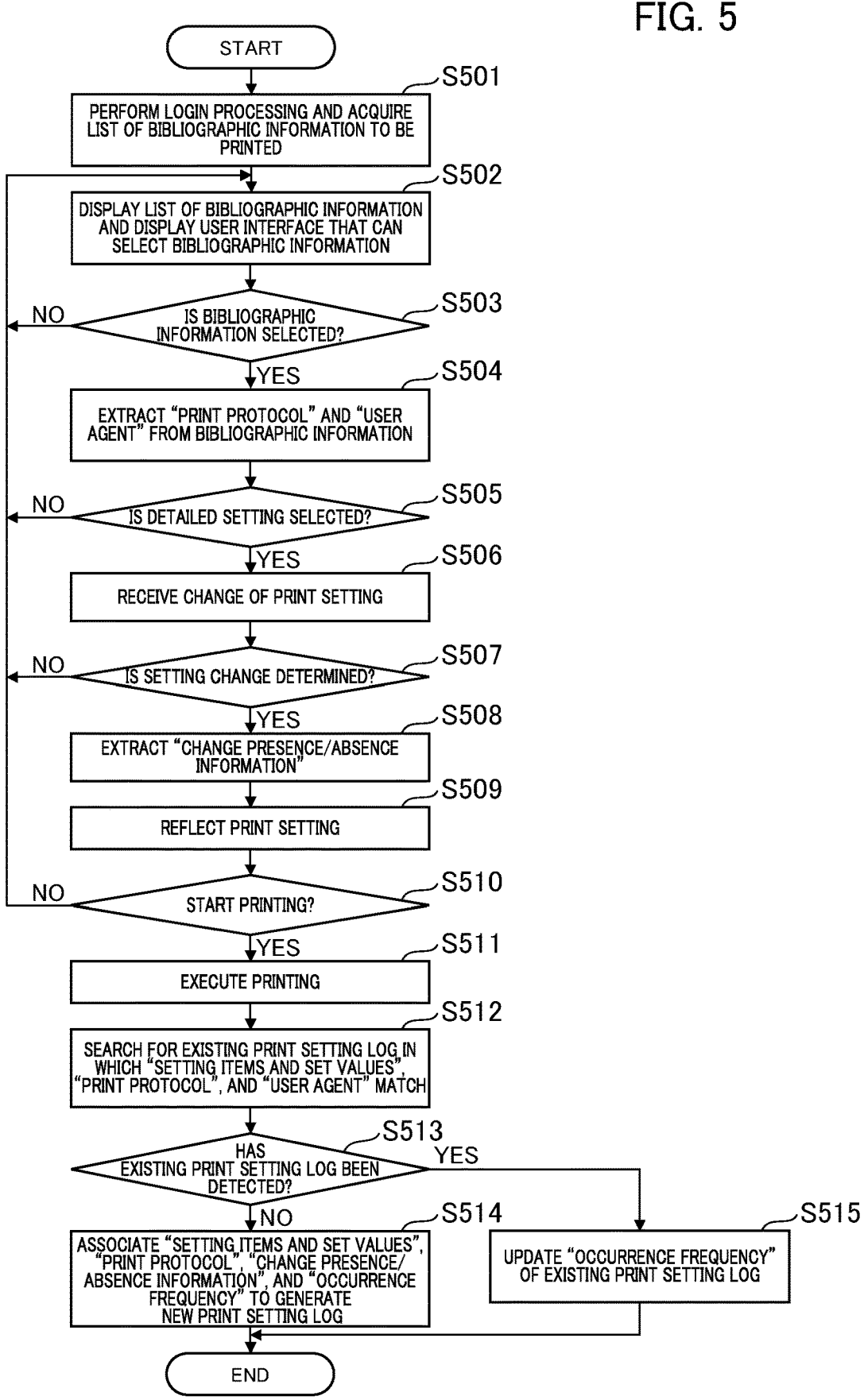
FIG. 5 is a flow chart illustrating print setting log storage processing of hold printing according to Embodiment 1 of the present invention.
Figure 6:
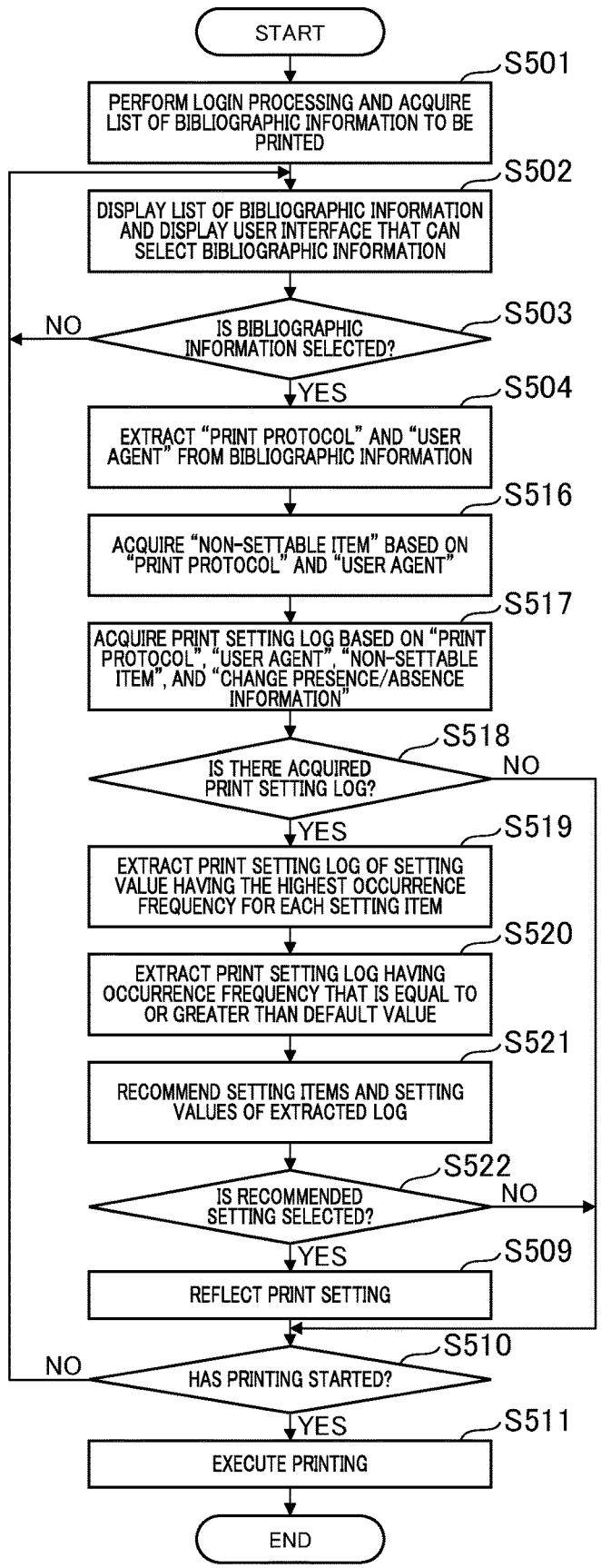
FIG. 6 is a flow chart illustrating print setting recommendation processing of hold printing according to Embodiment 1 of the present invention.
Figure 7:
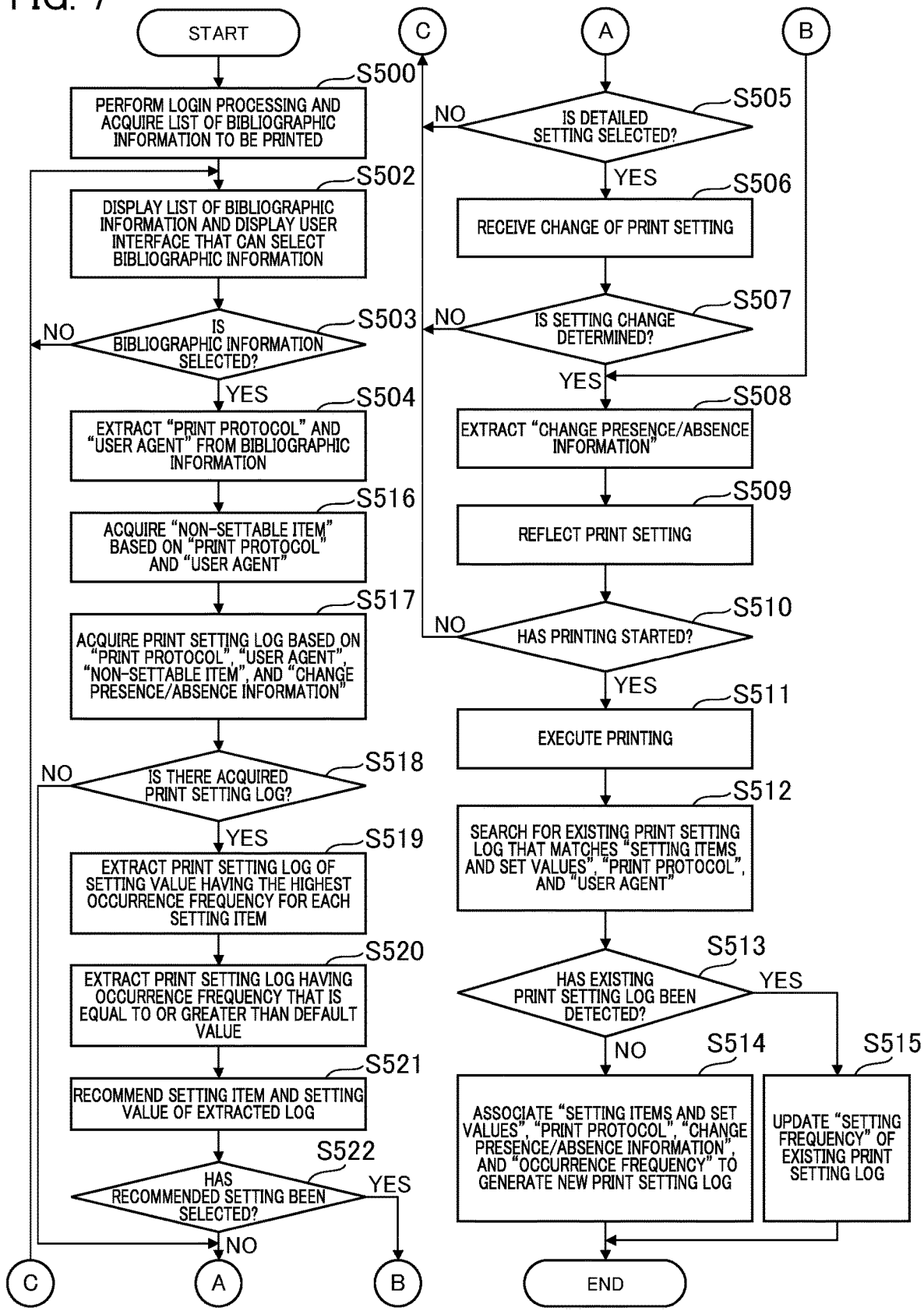
FIG. 7 is a flow chart illustrating a process in a case where the print setting log storage processing of hold printing and the print setting recommendation processing of hold printing are integrated in Embodiment 1 of the present invention.

FIG. 5 to FIG. 7 are flowcharts for explaining the print execution processing in the hold printing processing executed by the CPU 201 of the image forming apparatus 110. This flowchart is executed by the software modules described in FIG. 3.

FIG. 5 is a flowchart illustrating a process of storing a print setting log used for print setting recommendation (hereinafter, referred to as "print setting log storage processing"). FIG. 6 is a flowchart illustrating processing that recommends print setting by using a print setting log (hereinafter, referred to as "recommended setting presenting processing"). FIG. 7 is a flowchart illustrating a case where the print setting log storage processing of FIG. 5 and the recommended setting presenting processing of FIG. 6 are integrated. Note that since the process shown in the flowchart of FIG. 7 is the same as the corresponding processes shown in FIG. 5 and FIG. 6, the description thereof will be omitted.

First, the print setting log storage processing will be described with reference to FIG. 5.

The authentication unit 302 receives a login request from the user interface control unit 301, and then performs login processing based on the authentication information received from this user interface control unit 301. As the login processing performed by the authentication unit 302, it is possible to adopt the method for displaying an authentication screen on the operation unit 206 and urge the user to input a user name and a password, and the processing by using the card authentication method that uses proximity wireless communication such as NFC and the like. Upon completion of the login processing, the authentication unit 302 provides a notification about the login completion to the print control unit 300. This login completion notification includes information specifying the user who has logged in.

Upon receipt of the login completion notification from the authentication unit 302, the print control unit 300 acquires a list of the bibliographic information corresponding to the log-in user from the HDD 203 (S501).

Next, based on the control of the print control unit 300, the user interface control unit 301 causes a display device (not illustrated) of the operation unit 206 to display a user interface screen (not illustrated) (S502). A list of print job data is displayed on this user interface screen. This list is made based on the list of the bibliographic information acquired in step S502 and enumerates character strings indicating the names of print jobs. The user can select a print job to be printed based on the display of the user interface screen.

Upon detecting that the print job data has been selected, the user interface control unit 301 provides a notification about the selected print job data to the print control unit 300. Upon receiving the notification ("YES" in S503), the print control unit 300 extracts the print protocol and the user agent from the bibliographic information of the selected print job (S504).

Upon detecting that the detailed setting has been selected on the user interface screen, the user interface control unit 301 provides a notification about information indicating the detection to the print control unit 300. Upon receiving this notification ("YES" in S505), the print control unit 300 controls the user interface control unit 301 to display a detailed setting screen for allowing the user to change the setting of each setting item of the print setting on the user interface screen (S506).

If the setting change on this detailed setting screen is determined ("YES" in S507), the user interface control unit 301 provides a notification about the print setting after a change to the print control unit 300.

Upon receipt of the notification, the print control unit 300 extracts the change presence/absence information of the corresponding print setting log from the print setting log stored in the HDD 203 (S508, Table B). Note that the print setting log that extracts the change presence/absence information is specified based on the print protocol and the user agent extracted from the bibliographic information in step S504.

In this context, the change presence/absence information is information indicating whether or not the setting has been changed, which is indicated by either "presence" or "absence" (as described above). The change presence/absence information is stored for each setting item, and additionally, stored for setting items not included in the bibliographic information (non-settable items, in other words, setting items that cannot be set by the application program of the information processing device 120). As described above, the non-settable item is set to a default value that has been set in advance in the image forming apparatus 110, and if the user changes the default value to another setting value, "presence" is stored as "the change presence/absence information".

In step 509, the print control unit 300 performs processing that reflects the print setting after setting change to the print execution unit 304. Thus, the print execution unit 304 prepares to print the print job data in the print setting after setting change.

Subsequently, when the user requests starting the printing on the interface screen, the user interface control unit 301 detects this request and provides the notification to the print control unit 300 (S510).

Subsequently, the print control unit 300 transmits the print job data to the print execution unit 304 and causes the print execution unit 304 to execute the printing processing (S511).

Subsequently, under the control of the print control unit 300, the log storage unit 305 searches for whether or not a print setting log in which all of "setting items and setting values", "print protocol" and "user agent" matches with the print settings used in the printing processing are stored in the HDD 203 (S512). At this time, the "setting items" and "setting values" to be searched for are all setting items and setting values after the change has been determined in step S507.

If it is determined in the search of step S512 that the corresponding print setting log has not been stored in the HDD 203 ("NO" in S513), the log storage unit 305 generates a new print setting log including "setting items and setting values" "print protocol", "user agent", and the "change presence/absence information" extracted in step S508 (S514). Subsequently, the log storage unit 305 set "setting frequency" of this new print setting log to "1" and stored the new print setting log in the HDD 203. Specifically, if there is no corresponding existing print setting log as the result for the search in step S512, the "setting frequency" is set to "1" because the printing processing using the above print setting for the first time.

In contrast, if there is a corresponding existing print setting log as the result for the search in step 512 ("YES" in S513), the value of "setting frequency" in the corresponding existing print setting log is updated to a value increased by "1" (S515). Thus, the print setting log storage processing in the print holding printing ends.

Next, the recommended setting presenting processing in FIG. 6 will be described.

First, upon receipt of a login request from the user interface control unit 301, the authentication unit 302 performs login processing in a manner similar to the print setting log storage processing of FIG. 5 and provides a notification about the completion of login to the print control unit 300.

In a manner similar to steps S501 to S504 in FIG. 5, the print control unit 300 acquires the list of the bibliographic information from the HDD 203 (S501), displays the list of print job data on the user interface screen (S502), provides a notification about the selected result of the print job data ("YES" in S503), and extracts the print protocol and the user agent based on the selected result (S504).

Subsequently, the print control unit 300 provides a notification about the print protocol and the user agent extracted in step 504 to the non-settable item determination unit 306. The non-settable item determination unit 306 acquires a non-settable item corresponding to the type of the application program (that is, the job input means) specified by the notified combination of the print protocol and the user agent from the HDD 203 (S516).

The print control unit 300 controls the log storage unit 305 to search for and acquire a print setting log in which "setting item" matches the non-settable item acquired in step S516, "print protocol" and "user agent" match the "print protocol" and "user agent" acquired in step S504, and "change presence/absence information" is "presence" from among the print setting logs stored in the HDD 203 (S517).

If it is decided in step S518 that at least one print setting log can be acquired in step S517, the log storage unit 305 extracts a print setting log having the highest setting frequency, for each setting item, from among the acquired print setting logs (S519), and extracts a print setting log having a value "setting frequency" that is equal to or greater than a predetermined default value from among the extracted logs (S520).

Here, the default value compared with the "setting frequency" may be set by using any method. For example, a fixed default value may be stored in advance on the HDD 203, or the default value may be variable and may be automatically calculated in accordance with the situation of use and the like. Additionally, although there may be a case in which a plurality of print setting logs having different setting values exist for one setting item, and each "setting frequency" of those print setting logs is equal to or greater than the default value, in this case, for example, the print control unit 300 may adopt a print setting log having the largest setting frequency. Further, "latest update date and time" is added as an item of the print setting log, and if a plurality of print setting logs having the same setting frequency exists, a print setting log having the latest "latest update date and time" may be adopted.

Subsequently, the log storage unit 305 transmits the print setting log extracted in step S519 to the print control unit 300.

Then the print control unit 300 controls the user interface control unit 301 to display "setting items" and "setting values" of the received print setting log on the display device of the operation unit 206 as recommended settings (S521).

If the recommended setting has been selected ("YES" in S522), the user interface control unit 301 provides a notification about the selection result to the print control unit 300.

Accordingly, the print control unit 300 performs processing that reflects the print setting after a setting change to the print execution unit 304 (S509). Then, the print execution unit 304 prepares to perform print processing of the print job data in the print setting after setting change.

In contrast, if the recommended setting has not been selected, the print execution unit 304 prepares to perform print processing of the print job data without changing the print setting.

Subsequently, when the user requests to start printing on the interface screen, the user interface control unit 301 detects this request and provides a notification about this request to the print control unit 300 (S511), and the print control unit 300 transmits the print job data to the print execution unit 304 and causes the print execution unit 304 to execute the printing processing (S511).

Thus, the recommended setting presenting processing in hold printing ends.

In the present embodiment, if a plurality of print setting logs having different setting values exists for the same setting item, the recommended setting processing may be performed by selecting one of the print setting logs, a plurality of recommended settings may be displayed on the user interface screen so as to make user select, or another means may be used.

Additionally, in the present embodiment, although "setting frequency" is set in the print setting log to be used as a determination material when recommending settings, the determination is not necessarily to have to use the "setting frequency". For example, the combination of only the latest "setting values" for each of "setting item", "print protocol", "user agent", and "change presence/absence information" may be stored as history as one print setting log, and the "setting value" stored as history may be displayed during presentation of the recommended setting.

Further, in the present embodiment, although the recommended setting is presented for a non-settable item that cannot be set by the job input means specified by the combination of "print protocol" and "user agent", the recommended setting may also be presented for a settable item. In this case, for example, both "recommended setting only for a non-settable item" and "recommended setting for a settable item and a non-settable item" may be presented to the user.

[User Interface Screen for Hold Printing Processing]

FIG. 8 to FIG. 10B illustrate an example of the user interface screen that is displayed on the display device of the operation unit 206 on the basis of controlling of the print control unit 300 to the user interface control unit 301.

Figure 8A:
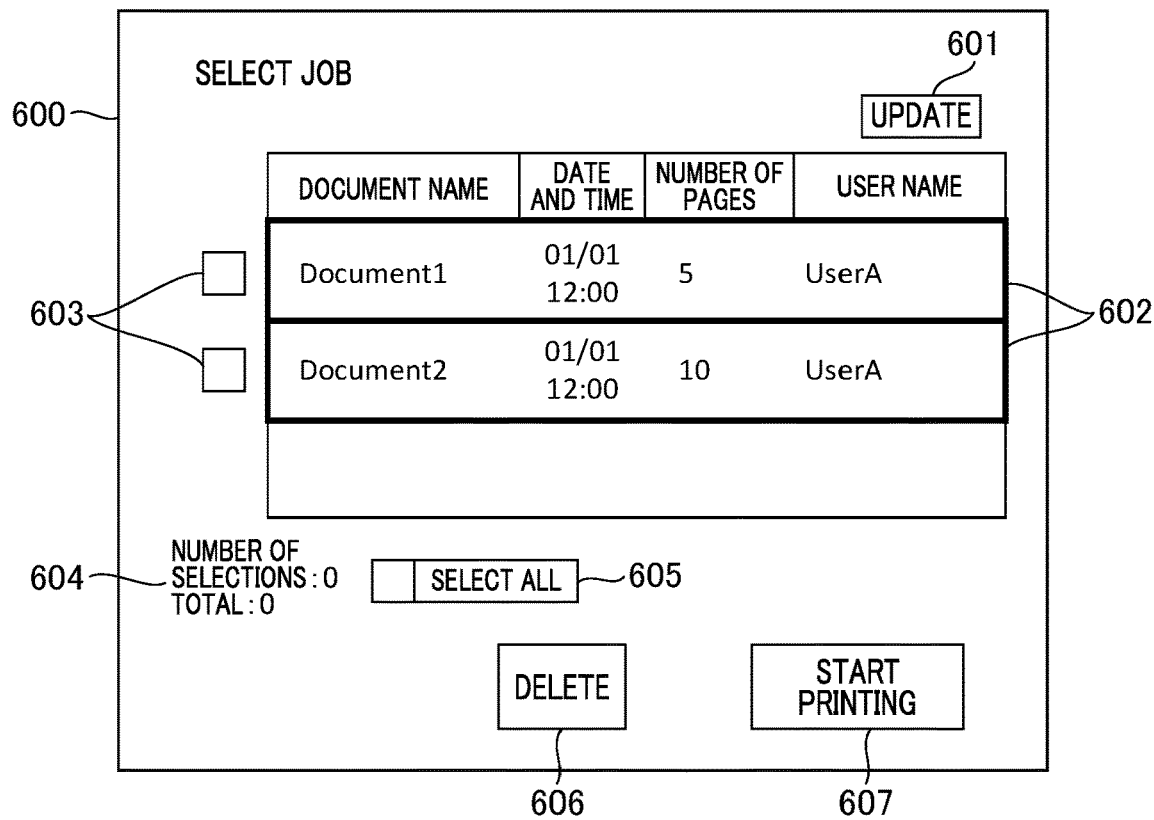
FIG. 8A and FIG. 8B are conceptual diagrams illustrating a user interface screen for job selection in Embodiment 1 of the present invention.

FIG. 8A illustrates a display example of a user interface screen 600 used in the step of selecting the bibliographic information displayed in step 502 of FIG. 5.

In FIG. 8A, an update button 601 is a button for updating the screen.

A selection button 602 is a button for selecting the bibliographic information to be subjected to hold printing (see step S503 in FIG. 5). By detecting the pressing of the selection button 602, the selection of the bibliographic information is determined without any other operations, and the user interface control unit 301 identifies the selected bibliographic information. Note that the selection button 602 displays a document name that is the name of the print job data, a generated date, the number of pages, and a generated user name. These pieces of information are included in the bibliographic information transmitted from the information processing device 120.

A check box 603 is used for selecting the bibliographic information, where a plurality of pieces of bibliographic information can also be selected simultaneously. If the bibliographic information is merely selected by the check box 603, the process does not proceed to step 503 in FIG. 5.

A display region 604 displays the number of print job data selected at the check box 603 and a numerical value indicating the total number of print job data.

A select all button 605 is a button pressed if all pieces of bibliographic information are desired to be selected simultaneously at the check box 603.

A delete button 606 is a button for providing an instruction to delete the print job that corresponds to the bibliographic information selected at the check box 603.

A print start button 607 is a button that determines the selection by the check box 603 and provides an instruction to proceed with the printing processing of the print job corresponding to the selected bibliographic information.

Figure 8B:
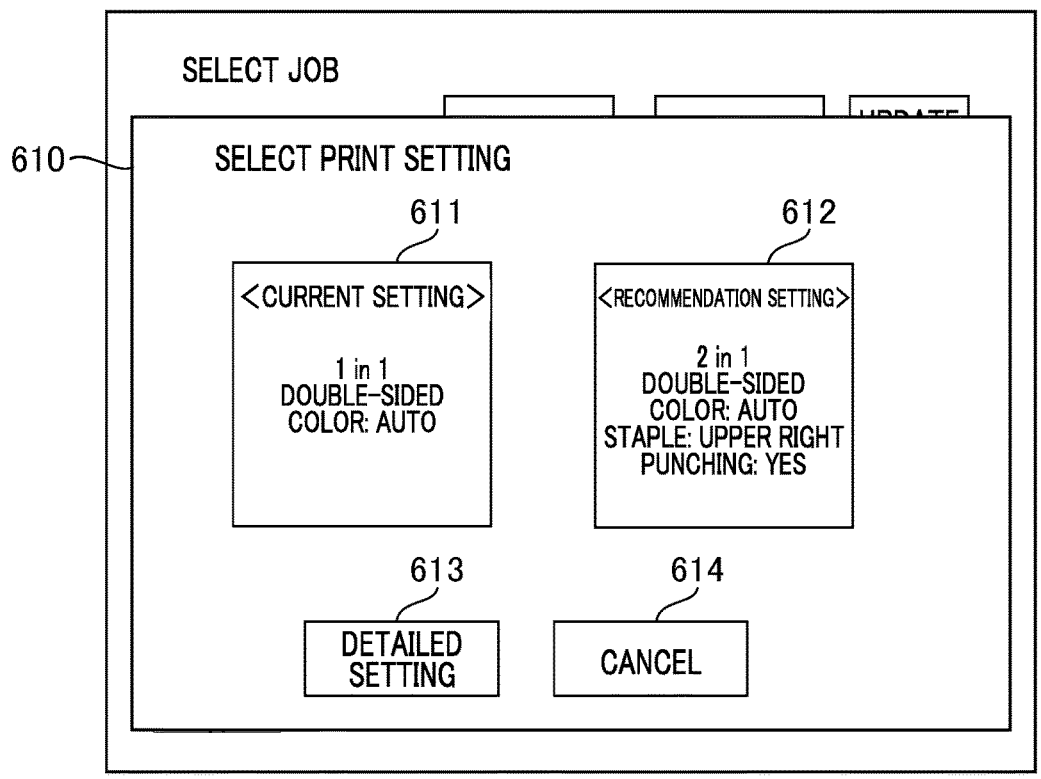

FIG. 8B illustrates a display example of a dialog 610 displayed after the bibliographic information has been selected in step 503 of FIG. 5.

In FIG. 8B, a selection button 611 is a button indicating the current print setting set by the job input means (described above), and a selection button 612 is a button indicating the recommended setting. Upon pressing of the selection button 611, the print setting is not changed. In contrast, upon pressing of the selection button 612, the recommended setting is reflected in the print setting. Note that in the present embodiment, although the information about the print setting is shown as a character string in the selection buttons 611 and 612, an icon, a thumbnail image, and the like indicating a state in which the print setting is applied may be displayed.

A detailed setting button 613 corresponds to step S505 in FIG. 5, and is pressed when the user wishes to change the print setting which is not set by the job input means (that is, print setting interpolated with a default value), without selecting the current setting or the recommended setting. In the present embodiment, a setting related to the printing appearance is the one that can be changed in the detailed setting (see FIG. 9 and FIG. 10 to be described below).

A cancel button 614 is a button that cancels the recommended setting selection and the detailed settings of the selected bibliographic information, and the screen 610 closes by pressing the button.

Figure 9A:
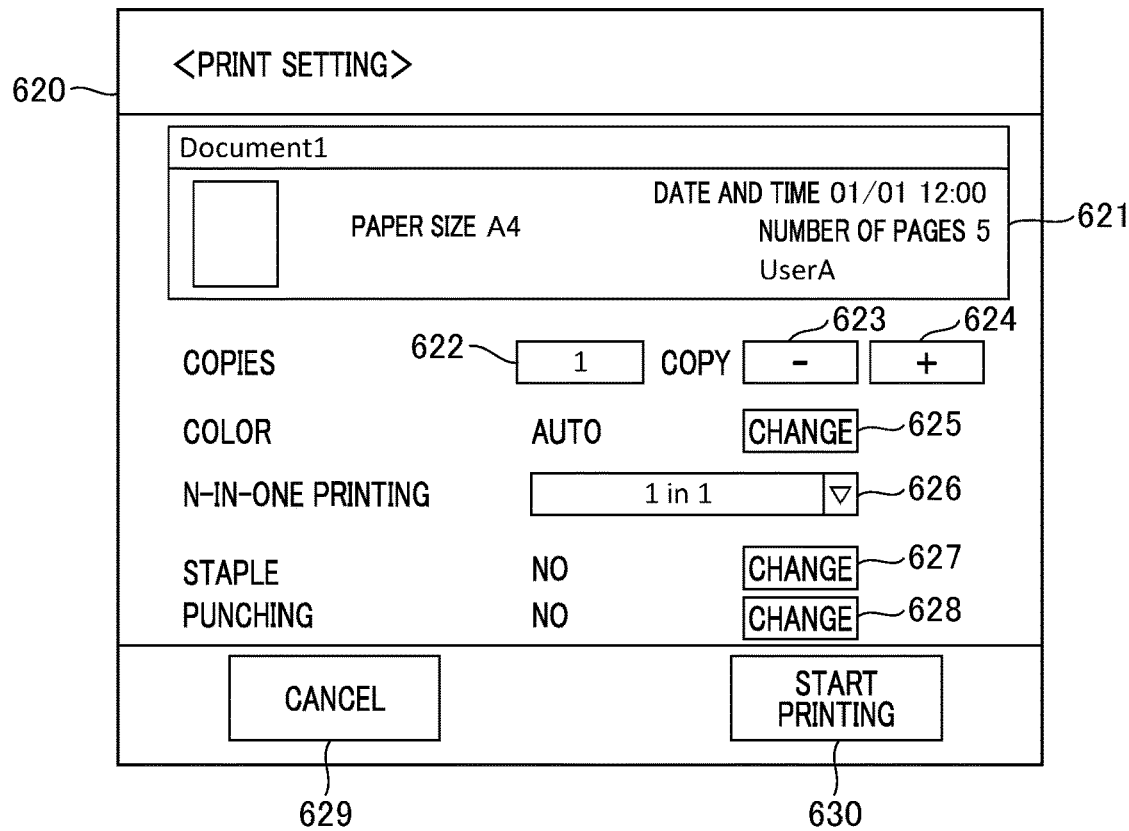
FIG. 9A and FIG. 9B are conceptual diagrams illustrating a user interface screen for print setting in Embodiment 1 of the present invention.

FIG. 9A is a display example of a user interface screen 620 displayed for changing the print setting in step S506 of FIG. 5.

In FIG. 9A, the selected bibliographic information is displayed in a display region 621.

A text box 622 is an input region for the user to specify the number of copies of print job data to be output. The number in the text box 622 can be changed by using a hardware key (not illustrated) of the operation unit 206 and increase/decrease buttons 623 and 624.

A change button 625 is a button for changing the color mode setting in the print setting. Upon detection of the pressing of the change button 625, the print control unit 300 displays a dialog 630 for setting the color mode (see FIG. 9B to be described below).

A drop-down button list 626 is used to perform N-in-one printing settings.

The staple function setting button 627 is a button that sets a staple function (that is, the function of binding printing papers by using staples) in the print setting. Upon detecting the pressing of the staple function setting button 627, the print control unit 300 displays a dialog 640 for changing the setting of the staple function (see FIG. 10A to be described below).

A punching function setting button 628 is a button for setting a punching function (that is, the function of providing a punching hole in a printing paper) in the print setting. Upon detecting the pressing of the punching function setting button, the print control unit 300 displays a dialog 660 for changing the setting of the punching function (see FIG. 10B to be described below).

A cancel button 629 is a button for providing an instruction to cancel the detailed setting and return to the user interface screen 600.

Figure 9B:
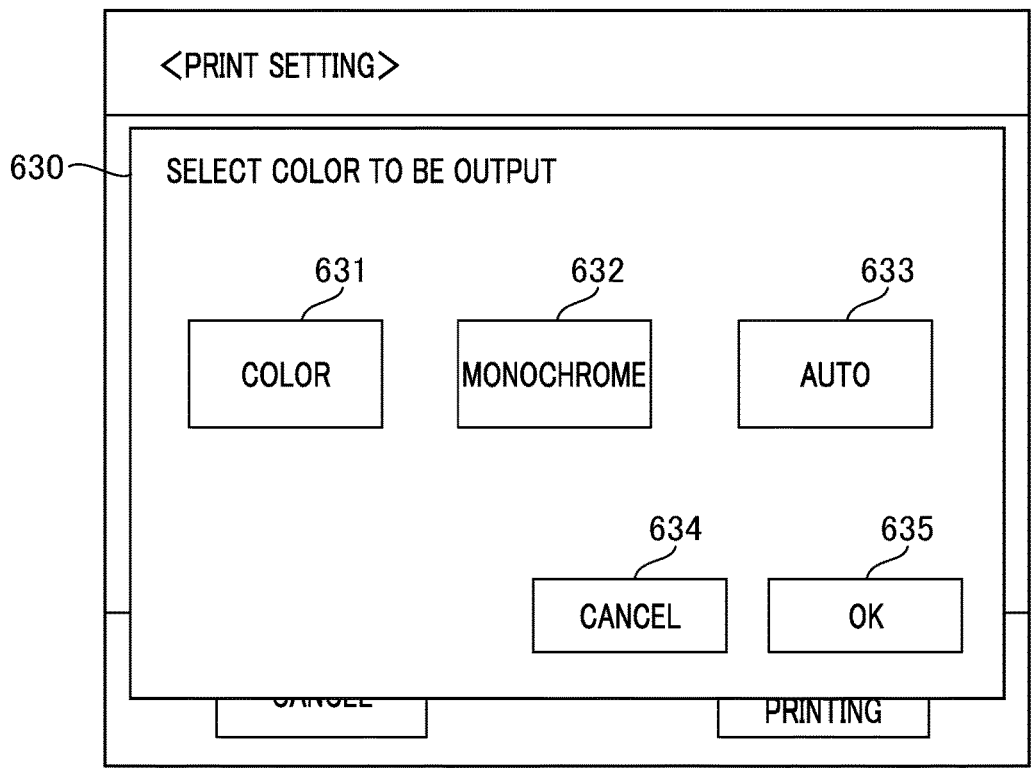

FIG. 9B illustrates an example of the dialog 630 used for setting the color mode.

As shown in FIG. 9B, toggle buttons 631 to 633 for switching between color, monochrome, and automatic setting modes are displayed in the dialog 630. Additionally, a button 634 for canceling the color mode setting and a button 635 for determining the color mode setting are displayed in the dialog 630.

Figure 10A:
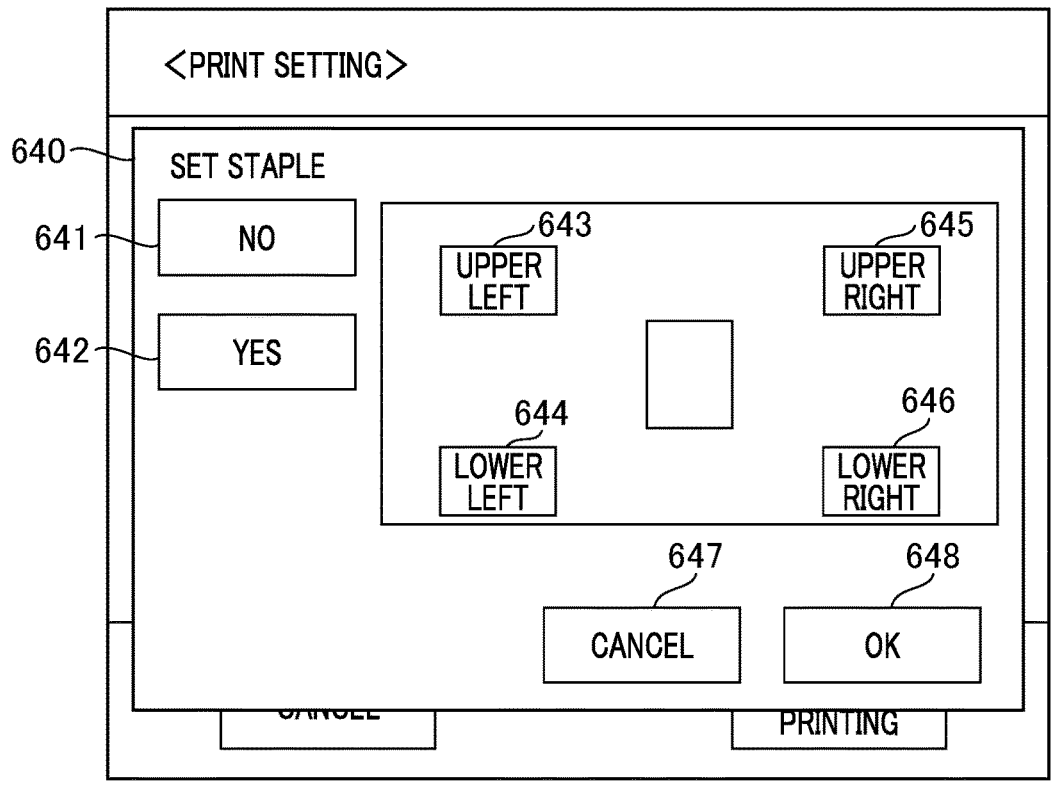
FIG. 10A and FIG. 10B are conceptual diagrams illustrating a user interface screen for print setting in Embodiment 1 of the present invention.

FIG. 10A is an example of the dialog 640 used for setting the staple function.

As shown in FIG. 10A, the dialog 640 displays toggle buttons 641 and 642 for switching the execution/non-execution of the staple function, and toggle buttons 643 to 646 for specifying the position where the printing paper is to be bound from among the upper left, lower left, upper right, and lower right. Additionally, a cancel button 647 for closing the dialog 640 without storing the staple setting and an OK button 648 for determining and storing the staple setting and closing the dialog 640 are displayed on the dialog 640.

Figure 10B:
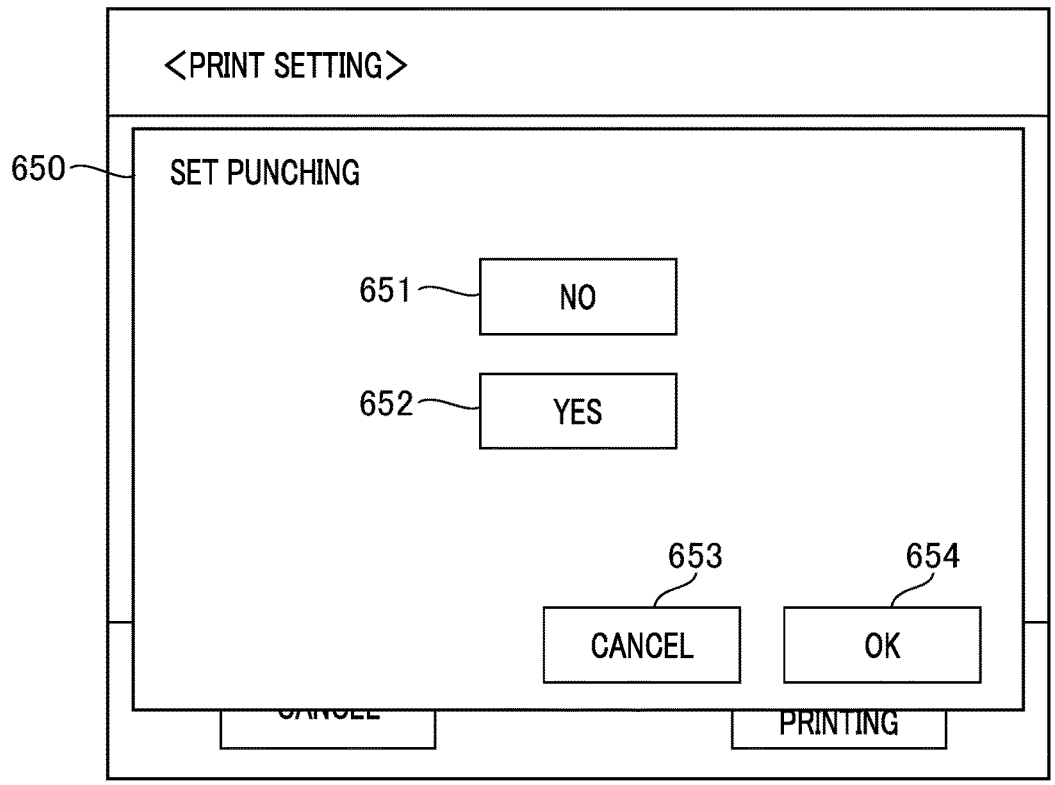

FIG. 10B illustrates an example of a dialog 650 used for setting the punching function.

As shown in FIG. 10B, the dialog 650 includes toggle buttons 651 and 652 for switching between execution/non-execution of the punching function. Additionally, the dialog 650 also includes a button 653 for canceling the punching setting and a button 654 for determining the punching setting.

As described above, according to the present embodiment, since the image forming apparatus 110 presents to the user the recommended setting only for the print setting items (here, N-in-one printing setting, color mode setting, staple function setting, and punching function setting) not included in the print setting items set in the application program of the information processing device 120, the user can easily change only the settings that could not be set in the application program. Therefore, according to the present embodiment, the load on the user during operation of the image forming apparatus can be reduced while effectively utilizing the print setting function mounted the application program.

Embodiment 2

In the above-described embodiment 1, "print protocol", "user agent", "setting items and setting value", "change presence/absence information", and "setting frequency" are used as information to be managed in order to determine the recommended setting. However, a case is conceivable in which the convenience would be more improved if the recommended setting is determined for each user.

Therefore, in Embodiment 2, an example in which recommended settings are made for each user will be described.

In the present embodiment, the network configuration, the hardware configuration, and the software configuration of the image forming apparatus are substantially the same as those in Embodiment 1 (see FIG. 1 to FIG. 3).

However, as shown in Table D, in Embodiment 2, the print setting log managed by the log storage unit 305 includes "user information" in addition to "print protocol", "user agent", "setting items and setting values", "change presence/absence information", and "setting frequency" managed in Embodiment 1. In the present embodiment, the UUID (Universally Unique Identifier), which is a user ID that uniquely identifies the user, is used as this user information.

Accordingly, in the present embodiment, even if the job input means (the type of application program specified by the combination of "print protocol" and "user agent") and "setting items" are the same, the "setting values", "change presence/absence information", and "setting frequency" stored in the print setting log are managed separately if the "user information" is different.

For example, the "N-in-one printing" in the print setting log in Table D will be examined. If the "user information" is "613336750117-1000-afdc-000000000001", the "setting value" is "2 in 1", the "change presence/absence information" is "presence", and the "setting frequency" is "10". In contrast, if the "user information" is "613336750117-1000-afdc-000000000002", the "setting value" is "4 in 1", the "change presence/absence information" is "presence", and the "setting frequency" is "12".

used. This user information is managed by the HDD 203 or the information processing device 120 connected to the network.

If an existing print setting log has not been detected ("NO" in step S513), a new print setting log is generated in association with the "user information" in addition to the "setting items and setting values", "print protocol", "user agent", "change presence/absence information", and "occurrence frequency". In contrast, if an existing print setting log has been detected in step S513, "1" is added to the "occurrence frequency" in step S515.

Subsequently, the recommended setting presenting processing of Embodiment 2 will be described with reference to FIG. 6.

In Embodiment 2, when acquiring the print setting log in step S517, a log that also matches "user information" in addition to the "setting items and setting values", "print protocol", and "user agent" is acquired. If there is an acquisition log ("YES" in step S518), the process proceeds to step S519. Subsequently, the process that is similar to Embodiment 1 is performed to complete the recommended setting presenting processing in the hold printing.

In Embodiment 2, although the method for determining the recommended setting for each user by using the user information has been described, for example, the recommended setting may be determined for each group. In this

TABLE D

| USER INFORMATION (USER ID) | JOB INPUT MEANS | | SETTING | | CHANGE PRESENCE/ ABSENCE INFORMATION | SETTING FREQUENCY |
|---|---|---|---|---|---|---|
| | PRINT PROTOCOL | USER AGENT | SETTING ITEM | SETTING VALUE | | |
| 61333674-0117-1000-afdc-000000000001 | IPP | Android | N-IN-ONE PRINTING | 2in1 | PRESENCE | 10 |
| | IPP | Android | PUNCHING | ON | PRESENCE | 9 |
| | IPP | Android | COLOR MODE | AUTO | ABSENCE | 15 |
| | IPP | Android | STAPLE | UPPER RIGHT | ABSENCE | 15 |
| | LPR | iOS | N-IN-ONE PRINTING | 1in1 | ABSENCE | 15 |
| | LPR | iOS | PUNCHING | ON | PRESENCE | 13 |
| | ... | ... | ... | ... | ... | ... |
| 61333674-0117-1000-afdc-000000000002 | IPP | Android | N-IN-ONE PRINTING | 4in1 | PRESENCE | 12 |
| | IPP | Android | PUNCHING | OFF | ABSENCE | 14 |
| | IPP | Android | COLOR MODE | AUTO | ABSENCE | 14 |
| | IPP | Android | STAPLE | OFF | ABSENCE | 14 |
| | LPR | iOS | N-IN-ONE PRINTING | 2in1 | PRESENCE | 11 |
| | LPR | iOS | PUNCHING | ON | PRESENCE | 10 |
| | ... | ... | ... | ... | ... | ... |
| ... | ... | | ... | | ... | |

Hereinafter, a description will be given of the flow of the hold printing processing in Embodiment 2.

Although the hold printing processing according to Embodiment 2 is substantially the same as that in Embodiment 1 (see FIG. 5), the processing differs in the following points.

First, the print setting log storage processing of Embodiment 2 will be described with reference to FIG. 5.

In Embodiment 2, when searching the print setting log in Step S512, a log that matches "user information" in addition to "setting items and setting values", "print protocol", and "user agent" is searched. As this "user information", for example, user information used for logging-in in step S501 (that is, the user information of the logged-in user) can be case, in place of or in addition to the "user information" in Table D, a group ID is added to each print setting log and managed.

Other Embodiments

In Embodiments 1 and 2 described above, although an example of specifying the recommended print setting from among the "user information", "print protocol", "user agent", and "setting items and setting values" is shown, a predetermined "data feature" may also be stored in the print setting log in addition to these conditions, and the recommended print setting may be changed in accordance with this "data feature".

The "data feature" is, for example, a document name of the corresponding print job data, a pixel value of the corresponding print job data, and character information extracted from the print job data by a means not illustrated. Additionally, it may be possible to prompt the user to input print objective information when executing a printing, and to serve the print objective information as a "data feature".

In order to use the "data feature" for determining the recommended print setting, it is necessary to determine the identity of the "data feature" included in the print setting log and the "data feature" included in the bibliographic information of the hold printing job. However, if a document name, a pixel value, and the like are used as the "data feature" as described above, it is assumed that both of the data features rarely coincide with each other, and thus, it is necessary to determine the identity by using the degree of similarity. Specifically, if the similarity of the data feature to be compared is equal to or greater than a predetermined threshold, it is desirable to consider these data features to satisfy the requirement of identity. In order to quantify such a similarity, for example, in order to quantify a similarity of a document name, a general Levenstein distance, JALO Winkler distance, or the like can be used. Additionally, it is possible to calculate the similarity of the pixel value by using, for example, a distance in the RGB color space. Further, it is possible to calculate the similarity of the character information by mapping words in the vector space and using the cosine similarity, Euclidean distance, or the like.

Additionally, in using the similarity, the similarity obtained by weighting, adding, and integrating each of the similarity of the data name, the similarity based on the pixel value, the similarity based on the character information, and the like may be used. Note that the method for calculating the similarity is not limited to the method described herein, and other methods may be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-207878, filed Nov. 5, 2018, which is hereby incorporated by reference herein in its entirety.

What is claimed is:

1. A printing apparatus comprising:
an operation device;
a memory storing instructions; and
a processor executing the instructions to:
receive a print job transmitted from an external device;
store the received print job in association with user information in a storage device;
authenticate a user;
display a list of at least one print job which is stored in association with user information of the authenticated user;
acquire change history information indicating a print setting value of a print setting item has been changed in accordance with a change instruction received by the operation device, with the print setting item being a print setting item that has not been able to be set for the print job selected from the list by the external device having transmitted the print job to the printing apparatus,
display recommended settings that are print settings determined based on the acquired change history information about the selected print job, wherein the recommended settings include a print setting value for the print setting item that has not been able to be set by the external device;
receive, from the authenticated user by the operation device, a change instruction for changing a print setting value of a print setting item of a print job selected from the list based on a selection of the displayed recommended settings; and
execute the selected print job by using print setting values including the print setting value that has been changed in accordance with the received change instruction,
wherein the change history information updated based on the print setting value that has been changed in accordance with the received change instruction is managed.

2. The printing apparatus according to claim 1, wherein, if the presented recommended setting has been selected by the user, the stored print job is executed by using the recommended setting.

3. The printing apparatus according to claim 1, wherein the instructions further cause the printing apparatus to:
specify the print setting item that cannot be set by the external device based on a print protocol and an operating system that have been used when transmitting a print job by the external device.

4. The printing apparatus according to claim 1, wherein the print protocol and the operating system used when transmitting the print job by the external device, a print setting item, a print setting value, and a setting frequency are managed as the change history information.

5. A control method of a printing apparatus comprising:
receiving a print job transmitted from an external device;
storing the received print job in association with user information in a storage device;
authenticating a user;
displaying a list of at least one print job which is stored in association with user information of the authenticated user;

acquiring change history information indicating a value of a print setting item has been changed in accordance with a change instruction received by the operation device, with the print setting item being a print setting item that has not been able to be set for the print job selected from the list by the external device having transmitted the print job to the printing apparatus, displaying recommended settings that are print settings determined based on the acquired change history information about the selected print job, wherein the recommended settings include a print setting value for the print setting item that has not been able to be set by the external device;

receiving, from the authenticated user by the operation device, a change instruction for changing a print setting value of a print setting item of a print job selected from the list based on a selection of the displayed recommended settings; and executing the selected print job by using print setting values including the print setting value that has been changed in accordance with the received change instruction, wherein the change history information updated based on the print setting value that has been changed in accordance with the received change instruction is managed.

6. A non-transitory computer readable storage medium on which is stored a computer program for making a computer execute a control method for a printing apparatus, the control method comprising:

receiving a print job transmitted from an external device;
authenticating a user;
displaying a list of at least one print job which is stored in association with user information of the authenticated user;

acquiring change history information indicating a print setting value of a print setting item has been changed in accordance with a change instruction received by the operation device, with the print setting item being a print setting item that has not been able to be set for the print job selected from the list by the external device having transmitted the print job to the printing apparatus, displaying recommended settings that are print settings determined based on the managed acquired change history information about the selected print job, wherein the recommended settings include a print setting value for the print setting item that has not been able to be set by the external device;

receiving, from the authenticated user by the operation device, a change instruction for changing a print setting value of a print setting item of a print job selected from the list based on a selection of the displayed recommended settings; and executing the selected print job by using print setting values including the print setting value that has been changed in accordance with the received change instruction, wherein the change history information updated based on the print setting value that has been changed in accordance with the received change instruction is managed.

* * * * *